United States Patent [19]

Millett

[11] 4,075,930

[45] Feb. 28, 1978

[54] PNEUMATIC ACTUATOR SYSTEM AND METHOD

[75] Inventor: Dennis A. Millett, Tempe, Ariz.

[73] Assignee: The Garrett Corporation, Los Angeles, Calif.

[21] Appl. No.: 681,004

[22] Filed: Apr. 28, 1976

[51] Int. Cl.[2] .................... F16B 13/16; F16B 13/044; B64C 13/36

[52] U.S. Cl. ........................................ 91/361; 91/465; 137/627.5; 244/85; 418/150; 418/267

[58] Field of Search ................. 91/361, 459, 388, 450, 91/465; 418/150, 15, 266, 267, 181, 259, 260, 264; 244/78, 85; 137/627.5

[56] References Cited

U.S. PATENT DOCUMENTS

| | | | |
|---|---|---|---|
| 695,296 | 3/1902 | Fish | 418/264 |
| 2,379,811 | 7/1945 | Lincoln | 418/181 |
| 2,771,061 | 11/1956 | Farrow | 91/465 X |
| 2,873,725 | 2/1959 | Gilovich | 91/450 X |
| 3,107,695 | 10/1963 | Broadwell | 137/627.5 |
| 3,112,769 | 12/1963 | Broadwell | 137/627.5 |
| 3,263,572 | 8/1966 | Sunderland | 91/361 X |
| 3,763,744 | 10/1973 | Fournell et al. | 91/450 X |
| 3,772,889 | 11/1973 | Mason et al. | 91/361 X |
| 3,900,046 | 8/1975 | Burckhardt | 137/627.5 |

*Primary Examiner*—Carlton R. Croyle
*Assistant Examiner*—Leonard Smith
*Attorney, Agent, or Firm*—James W. McFarland; Albert J. Miller

[57] ABSTRACT

A system for precisely positioning a linearly movable output member incorporates an improved nonexpansion, bi-directional vane motor whose internal gas carrying chamber is configured to prevent radial vane reciprocation while the vanes of the motor are under pressure-generated side load. Position of the output member is electrically sensed and in response to the sensed position, pressurized gas flow to the vane motor is adjusted to precisely position the output member.

12 Claims, 5 Drawing Figures

PNEUMATIC ACTUATOR SYSTEM AND METHOD

BACKGROUND OF THE INVENTION

This invention relates to pneumatic actuator systems of the type utilizing rotary, pneumatic vane motors.

Certain instances of use of actuator systems such as in aircraft environments place a premium upon the weight, reliability, and compactness of unit design. For these reasons, therefore, it has been found in many instances that pneumatic actuator systems have distinct advantages over other types of power systems such as electrical or hydraulic systems. Exemplary of hydraulic actuator system and/or elements thereof to which the above described problems apply may be found in the following U.S Pat. Nos. 2,056,909; 2,345,920; 2,393,223; 2,653,551; 2,711,698; 2,777,396; and 3,260,210.

Utilization of a pneumatic actuator system provides the advantage of lower weight and more economical construction. One distinct advantage of a pneumatic system is that it may utilize a source of bottled gas or the like as a potential energy power source. Rotary, pneumatic vane motors are utilized to transform the potential energy of the stored, pressurized gas into rotational kinetic energy. Previous vane motors of the type referred to characteristically are expansion type motors wherein power is derived both from the presence of the pressure differential across the vane as well as expansion of the pressurized gas. While such expansion type vane motors extract a maximum amount of power from the pressurized gas, certain resulting limitations are necessarily incoporated within the vane motor itself. More particularly, such vane motors, by virtue of expansion of the incoming pressurized gas, must necessarily permit radial movement of the vanes of the motor while the vanes are subject to a pressure differential. The resulting frictional forces and side loads placed upon the vanes severely restricts the life and reliability of the motor. Furthermore, such known pneumatic actuator systems are the "open center" type which introduce an unnecessary loss of pressurized gas.

An exemplary application of such a pneumatic actuator system is in driving the flight control devices on an aircraft. Elements such as the flight stabilizing fins on a missle must be precisely controlled for efficient flight performance. Accordingly, the actuator system must necessarily provide the capability of extremely precise positioning of the power output actuator member.

SUMMARY OF THE INVENTION

It is therefore a primary object of the present invention to provide an improved construction of pneumatic vane motor for use in pneumatic actuator systems of the class described, wherein the vane motor is so constructed that the vanes thereof are never subject to side load while shifting radially so as to improve the mechanical efficiency, reliability, and life of the motor.

It is another important object of the present invention to provide an improved pneumatic actuator system and method of the class described which is capable of precisely positioning a linearly movable output member by virtue of rotation of a pneumatic vane motor.

In summary, the invention contemplates a pneumatic actuator system which includes a source supplying motive pressurized gas to a nonexpansion, rotary, bi-directional, pneumatic vane motor. Rotary output power from the motor is translated by a transmission into linear displacement of the output member. A linear variable differential transformer electrically senses the linear position of the output member, and controls responsive to the sensed position operate a pair of closed, center, poppet type, solenoid operated valves that control fluid flow to the motor. In this manner the output member may be precisely positioned.

These and more particular objects and advantages of the present invention are specifically set forth in or will become apparent from the following detailed description of a preferred embodiment of the invention when read in conjunction with the accompanying drawings.

DETAILED DESCRIPTION OF A PREFERRED EMBODIMENT

Figure 1:
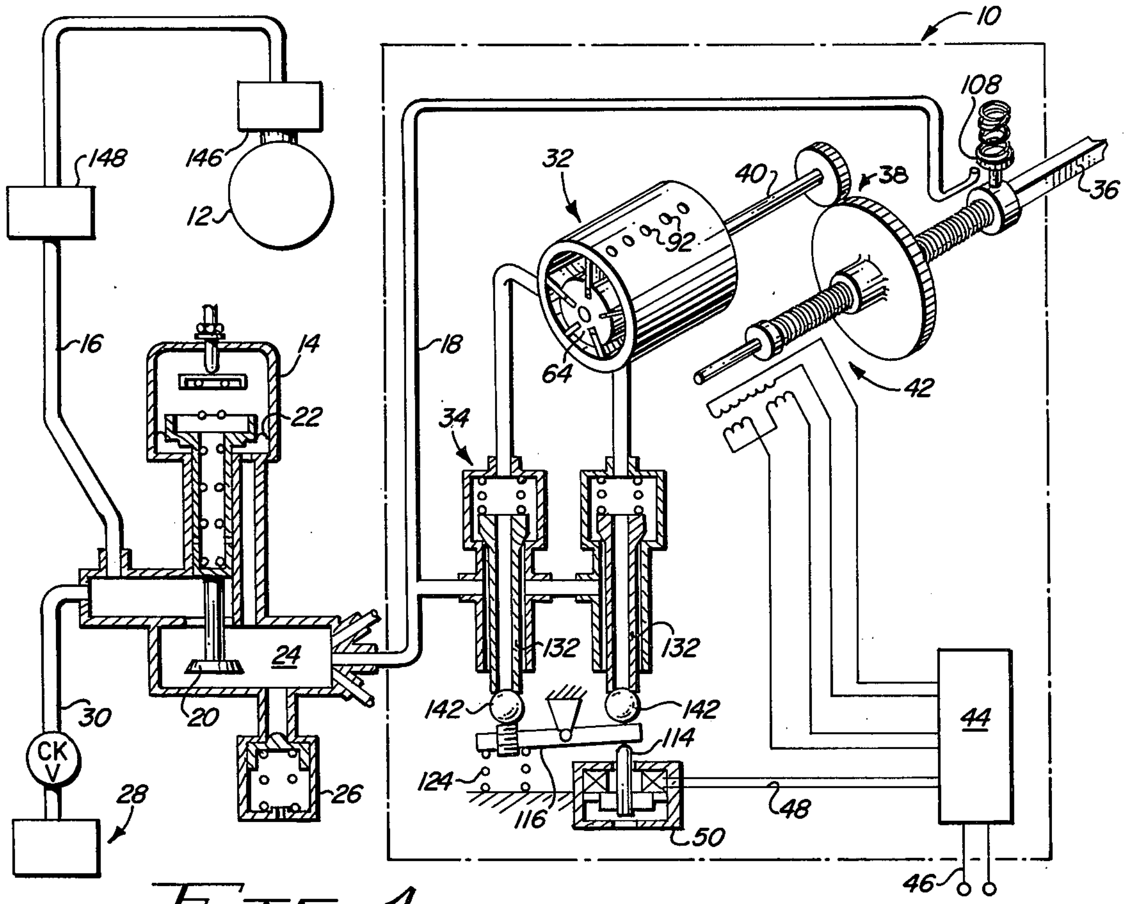
FIG. 1 is a schematic representation of a pneumatic actuator system constructed in accordance with the principles of the present invention.

Referring now more particularly to the drawings there is illustrated a pneumatic actuator system which generally includes an actuator system 10 circumscribed by dashed lines in FIG. 1, a source of bottled, pressurized gas 12, and a pressure regulator 14 of essentially conventional structure which is operable to regulate substantially high pressure gas delivered from source 12 through conduit 16 to a substantially lower, constant pressure output gas flow delivered to assembly 10 through conduit 18. Pressure regulator 14 includes a metering member 20 vertically shiftable as illustrated in FIG. 1 in response to a pressure differential across a diaphragm piston 22. Output pressure in chamber 24 downstream of metering member 20 is exerted against one side of piston 22, while a biasing spring 26 urges member 20 against the pressure in chamber 24. If pressure in chamber 24 exceeds the predetermined pressure level, member 20 is shifted upwardly to increase restriction to incoming flow into chamber 24 and thus reduce pressure to the preselected level. Similarly, a reduction in pressure in chamber 24 is accompanied by downward, opening movement of member 20 to increase pressurized flow. In this manner pressure in output conduit 18 is regulated to a preselected, substantially constant level. An overpressure relief valve assembly 26 is incorporated to prevent development of excess pressure in chamber 24. An alternative source of pressurized gas, such as bleed air from a gas turbine engine 28 powering the aircraft, may also be utilized by inclusion of a parallel input conduit 30 as illustrated.

The actuator assembly 10 generally includes a bi-directional, pneumatic vane motor 32 described in greater detail below, a flow control valve generally referred to by the numeral 34, a linearly shiftable output member 36, and transmission means in the form of an Acme nut and screw 38 extending between a rotary power output shaft 40 of motor 32 and output member 36. The actuator assembly further includes a position sensor in the form of a linear variable differential transformer (LVDT) 42 of substantially conventional structure. An electrical control system 44 receives the electrical signal from LVDT 42, compares it to electrical input command signal from electrical lines 46, and creates an output signal through lines 46 for driving a proportional solenoid 50 which operates the flow control means 34.

Figure 4:
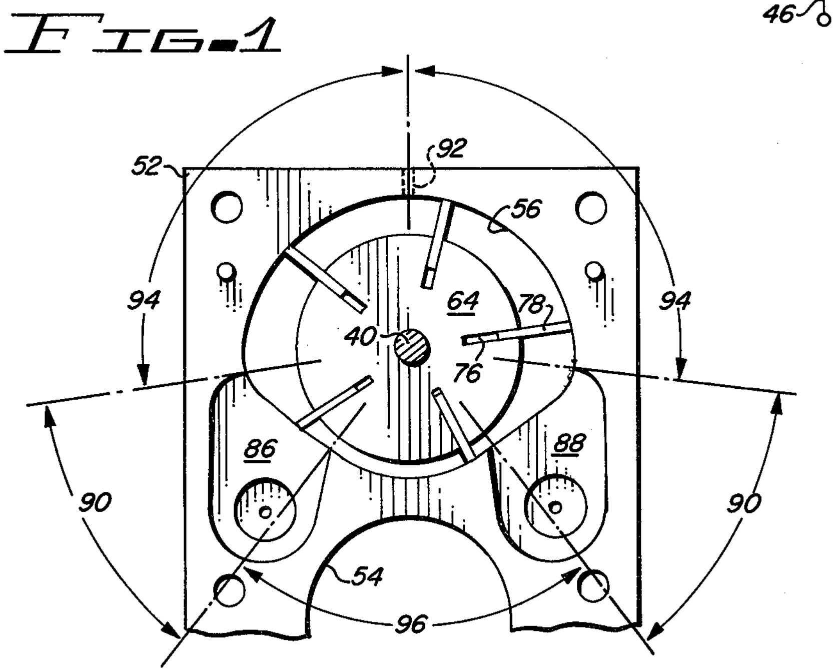
FIG. 4 is a front elevational view of the motor oriented 180 degrees to FIG. 3.
Figure 2:
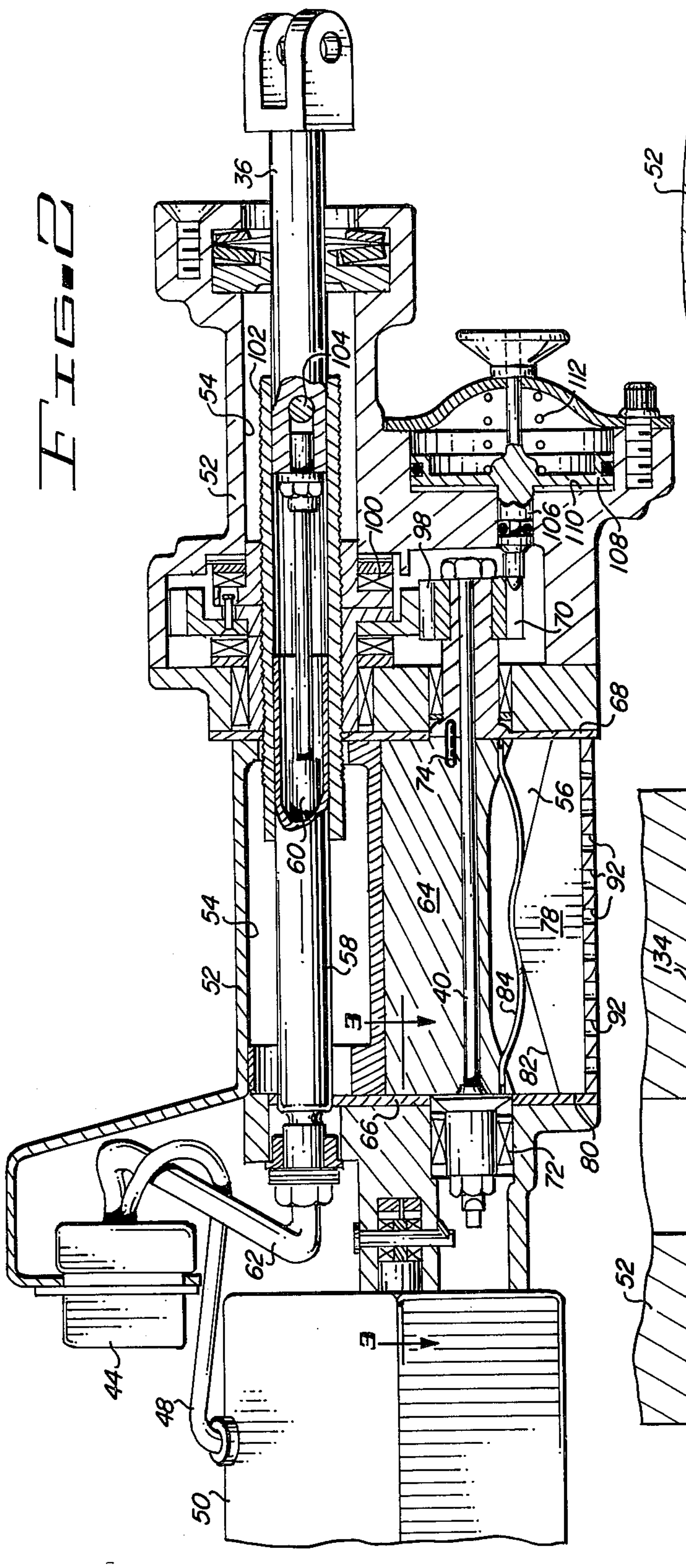
FIG. 2 is a longitudinal cross-sectional plan view of a pneumatic actuator system constructed in accordance with the principles of the present invention.
Figure 3:
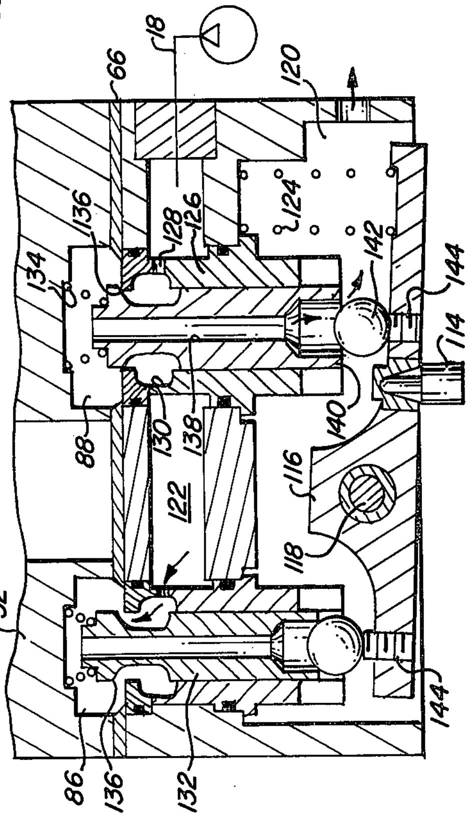
FIG. 3 is an enlarged, partial, fragmentary plan cross-sectional view taken generally along lines 3—3 of FIG. 2.

Referring now more particularly to FIGS. 2–4, all of the elements within actuator assembly 10 are contained within or operably secured to a housing 52 which is preferably made of a plurality of separate segments that are rigidly intersecured. Housing 52 defines a pair of axially elongated, separated internal chambers 54 and 56 which extend substantially parallel to one another. Output member 36 is appropriately mounted for linear reciprocation within chamber 54 and extends outwardly of the rightward end of housing 52 in sealing relationship therewith. Also disposed within chamber 54 is the LVDT of elongated, axial configuration. The LVDT includes a tubular segment 58 which carries the primary and secondary coil wingings of the LVDT, tubular segment 58 being hollowed for receiving a soft, permeable iron core 60 attached for linear reciprocation with output member 36. Linear movement of member 36 changes the position of core 60 to generate an electrical output signal transferred through line 62 to the electronic control unit 44.

The vane motor is rotatably mounted within the other chamber 56 and includes an elongated, generally cylindrical rotor 64 having a transverse end faces disposed in substantially sealing relationship with end faces 66 and 68 of housing 52. Rotor 64 is carried on central, quill type shaft 40 rotatably mounted to housing 52 at its opposite ends by appropriate bearings 72. Shaft 40 is mounted for rotation about a central longitudinal, axially extending axis thereof. Through a plurality of small quill pins 74, the shaft 40 and rotor 64 are operably intersecured in power transmitting relationship. Rotor 64 includes a plurality of equally spaced, narrow slots 76 extending throughout the entire length of rotor 64. Mounted for radial reciprocation within each of slots 76 is a radially extending vane 78 which traverses the internal chamber 56 to cooperate with the wall thereof and define a plurality of gas carrying interspaces between each of the vanes 78. At its opposite ends, each of the vanes 78 includes an outer end segment 80 which extends substantially parallel to and is arranged in substantially sealing relationship with the associated end faces 66 and 68. Radially inwardly from outer end segments 80, each of the vanes includes an inner end segment 82 which is configured so as to be recessed from the associated end faces 66 and 68. Within each slot 76 a leaf spring 84 is carried within the rotor 64 and engageable with the associated vane 78 so as to urge the latter radially outwardly toward the wall of chamber 56.

Housing 52 further defines a pair of gas receiving ports 86 and 88 which open into chamber 56 in corresponding port sections 90 of chamber 56, the angular extent of each of the port sections 90 being shown by dashed lines in FIG. 4. The housing further includes a substantially centrally located exhaust port in the form of a plurality of axially aligned, spaced apertures 92 which provide a path for low pressure gas exhaust from chamber 56. Between the central exhaust apertures 92 and the receiving ports 86 and 88 there is defined a pair of contiguous circular sections 94 of chamber 56 whose angular limits are illustrated again by dashed lines in FIG. 4.

Housing 52 is configured such that wall of chamber 56 within each of circular sections 94, is of circular configuration struck about a center of revolution which is coincident with the central longitudinal axis of shaft 40 and rotor 64. By virtue of the circular configuration of these circular sections 94, it will be apparent that each of the vanes 78 while traversing sections 94 will not be subject to any radial displacement or shifting within the associated slot 76. The wall of chamber 56 in each of the port sections 90 is so configured that each of the vanes 78 while traversing these port sections 90 are allowed to reciprocate or shift radially within the associated slot 76. It will be noted that the remaining section 96 of chamber 56 extending between the two receiving ports 86 and 88 also presents a circular wall which prevents reciprocation of the vanes while traversing this section. As a result of this configuration of chamber 56, each vane will reciprocate radially only while within the port sections 90. Since each of the respective ports 86 and 88 communicate with chamber 56 throughout the associated port sections 90, the pressure existing in each of the ports 86 and 88 will be present and both of the gas carrying interspaces on either side of each vane 78 while the latter is reciprocating within the associated port section 90. Accordingly, the motor housing is so configured that the vanes are pressure balanced while reciprocating radially so as to minimize side loads and frictional forces thereon which would otherwise reduce the mechanical efficiency of the motor due to reciprocation of vanes while subject to a side load.

An output spur gear 70 is rigidly secured to drive shaft 40 of the motor, and intermeshes with a larger gear 98 which comprises the nut of the Acme screw and nut transmission assembly 38. Gear 98 is appropriately mounted on bearings 100 and, along with gear 70, extends transversely across housing 52 for engagement with output member 36. Gear 98 is internally threaded and received upon the externally threaded screw portion 102 of the Acme screw and nut assembly, which screw 102 is rigidly affixed to output member 36 such as by a cross pin 104. Rotation of motor shaft 40 drives gears 70 and 98 such that the screw 102 shifts linearly as it advances along its threaded interconnection with gear 98 to effect precise linear movement of output member 36.

Housing 52 further includes a pneumatically operated detent member 106 having a piston 108 reciprocally mounted within a gas receiving chamber 110. Piston 108 is biased inwardly by a spring 112 such that detent 106 is engageable with gear 70 to prevent rotation thereof and movement of output member 36. Chamber 110 is operably communicating with conduit 18 (as schematically illustrated in FIG. 1) such that upon delivery of pressurized gas to the actuator assembly the detent 106 is shifted rightwardly as viewed in FIG. 2 out of engagement with gear 70 to permit movement of the latter. Housing 52 further carries the electronic control unit 44 and the proportional solenoid drive 50.

As depicted schematically in FIG. 1 and as shown in its actual structure in FIGS. 2 and 4, the proportional solenoid has a linearly movable output actuator pin 114 which is shiftable linearly in response to the electrical signal driving solenoid 50. Movement of pin 114 causes rotation of a rocker arm or beam link 116 about a pivot 118 associated therewith. Pivot 118 is mounted within a manifold portion of housing 52 which defines a low pressure exhaust chamber 120 and a relatively high pressure intake manifold 122 communicating with input conduit 18. Beam link 116 is biased by spring 124 to pivot in a clockwise direction with respect to FIG. 3.

The flow control means 34 includes a pair of substantially identical poppet valve structures respectively extending between each of the receiving ports 86, 88 and opposite arms of beam link 116. Each of these poppet valves includes an outer sleeve 126 rigidly affixed to the manifold portion of housing 52. Sleeves 126 are thus operably a portion of the housing 52 itself, and each sleeve 126 has an internal through bore therewithin and one or more cross passages 128 providing communication between intake manifold 122 and an enlarged portion 130 of the internal bore of the sleeve 126. Mounted for reciprocation within the internal bore of sleeve 126 is a poppet 132 which is spring loaded downwardly as illustrated in FIG. 3 by a spring 134. At its upper end the poppet 132 presents a tapered valving face 136 cooperable with the upper shoulder of sleeve 126 which presents a valving seat for interrupting communication between conduit 18 and the associated receiving port 86, 88 when the poppet 132 is shifted downwardly under the urgings of its associated spring 134. Poppet 132 also has an internal bore 138 whose upper end communicates with the associated receiving port 86, 88, and whose lower end defines an annular shoulder corner or valve seat 140. Loosely mounted between the associated arm of beam link 116 and this lower valve seat 140 is a ball type poppet 142. As shown by the left hand valve in FIG. 3, the beam link 116 is capable of engaging ball 142, urging it into sealing contact with valve seat 140, and consequently shifting the poppet 132 upwardly to move valving surface 136 off of its associated seat and permit communication between conduit 18 and receiving port 86. In the position of beam link 116 illustrated in FIG. 3, gas flow being exhausted from the pneumatic motor through receiving port 88 is exhausted through internal bore 138 to shift the associated ball 142 downwardly away from seat 140 and permit exhaust flow onto exhaust chamber 120. In the nonoperating, null condition when output member is in its desired, selected position and no movement thereof is required, the proportional solenoid is in its null condition with pin 114 at a substantially central position. In this null position both of balls 142 are essentially in sealing engagement with the associated seats 140, and also both of the other valving surfaces 136 are in their flow interrupting position. Adjustment screws 144 which are adjustable upon initial assembly of the unit compensate for manufacturing tolerances to permit the simultaneous seating of balls 142 and valving surfaces 136. Thus, it will be apparent that the two valve poppets of flow control means 34 are of the "closed center" type essentially blocking flow from conduit 18 to minimize loss of pressurized gas when the actuator assembly 10 is not in operation.

To initiate operation of the system, an electro-explosively actuated cutter valve 146 is electrically energized to pierce the closure in pressure vessel 12 and permit flow of high pressure gas from source 12 through conduit 16. Particularly in such arrangements where a dual source of pressurized flow is utilized such as illustrated in FIG. 1, a pressure regulating mechanism 148 is incorporated in conduit 16 upstream of pressure regulator 14. The regulator 148 reduces pressure received from source 12 to a level comparable to that received from the other source 28 so that a single pressure regulator 14 may properly operate when supplied with gas flow from either source.

To effect movement of output member 36, such as rightward movement of it in FIG. 2, an input command signal across electrical lines 46 into the electrical control unit 44 specifies a new desired location of output member 36. Comparing the actual position of output member 36 as sensed LVDT 42, the electronic control unit generate an output error signal across electrical lines 48 to energize proportional solenoid 50 and allow spring 124 to pivot beam link 116 in a clockwise direction as viewed in FIG. 3. Upward motion of the left hand valve poppet 132 opens communication between intake manifold 122 and receiving port 86.

Figure 5:
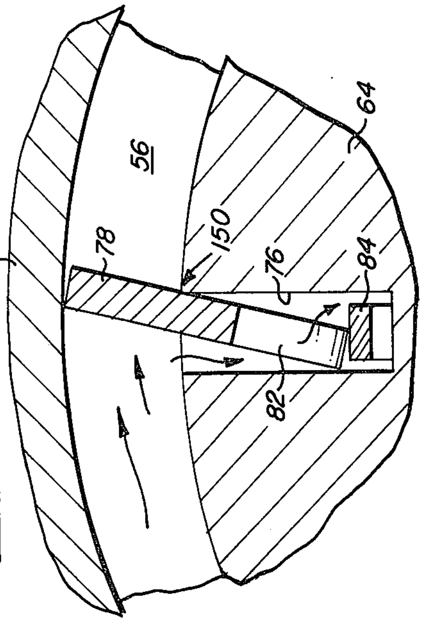
FIG. 5 is a fragmentary, enlarged, cross-sectional view of one of the vanes of the motor that is subject to a pressure differential.

Referring now to FIGS. 4 and 5, the pressurized input gas flow into receiving port 86 creates a fluid pressure differential across the vane 78 situated within the left hand circular section 94 of chamber 56 as illustrated in FIG. 4. Accordingly, this pressure differential creates clockwise rotation of rotor 64 as viewed in FIG. 4. As illustrated in exaggerated form in FIG. 5, the pressure differential across the vane 78 causes a slight cocking or tilting of that vane within the associated slot 76 due to the relatively loose fit therebetween. Accordingly the higher pressure gas flow may pass downwardly and through inner end segment 82 of the associated vane 78 and fill slot 76. This higher pressure thus assists spring 84 in urging the vane outwardly into sealing engagement with the wall of chamber 56. Another sealing point thus created is the corner denoted by the numeral 150 in FIG. 5. In this manner the slots 76 are always in communication with one of the interspaces of chamber 56, and no additional ducting, valving, etc. is required in order to control pressure within the slots themselves below the associated vane 78.

As the vane in the left hand circular section 94 travels clockwise, it will not reciprocate radially within the associated slot 76 and thus the "cocked" disposition of the associated vane 78 does not increase vane wear to any substantial extent.

The vane 78 which is disposed in the receiving port section 90 associated with port 86 shifts radially outwardly with the clockwise rotation of rotor 64, but during this outward reciprocation there is no substantial side load placed upon the vane since the pressurized receiving port 86 is communicating with both the interspaces on opposite sides of that particular vane.

Once the vane in section 90 begins entering the adjacent circular section 94, it will become subject to the gas pressure differential thereacross. However, at the same time the succeeding vane 78 which has been disposed in the left hand circular section 94 is now in a position crossing exhaust apertures 92. As a result of this arrangement, only one vane 78 at a time is subject to the gas pressure differential thereacross. Accordingly, the vane motor exhibits a very small torque ripple output. Such minimization of torque ripple output is an important feature of the present invention, providing repetitive, reliable system operation by virtue of its constant torque output.

As a vane 78 leaves the right hand circular section 94 and begins entering the port section 90 associated with port 88, it will begin reciprocating inwardly. Inward movement of this vane 78 displaces a certain volume of gas from the leading interspace into receiving port 88. This exhaust gas passes through the central, internal passage 138 associated with port 88 as shown in FIG. 3, forces the valve ball 142 downwardly off of seat 140 and permits exhaust of this displaced gas.

The above described operation of the vane motor continues so long as pressurized gas is delivered into receiving port 86, creating a constant, low torque ripple, power driving of shaft 40, the Acme screw and nut transmission, and thus rightward shifting of output member 36. As output member 36 reaches the desired location as specified by the input command signal, this correct position of the output member is sensed by the LVDT and transmitted back to the electronic control unit. The electronic control unit in response thus returns proportional solenoid 50 to its null position closing both of the poppet valves 132 and bringing the system back to rest. Essentially identical, but reverse operation occurs whenever an input command signal rotates beam linkage 116 counterclockwise about its pivot 118 as illustrated in FIG. 3 in order to drive the output member 36 in an opposite direction. In this manner the actuator assembly is capable of extremely precise positioning of output member 36 in order to provide the necessary precise control of aircraft operation. It will be noted that by virtue of the Acme screw and nut transmission arrangement, that the actuator assembly is essentially impervious to loads placed upon the output member 36, since such loads cannot reverse drive the rotor 64 through the transmission 38. It will be noted that throughout system operation, the motor 32 acts substantially as a nonexpansion motor relying primarily only upon the pressure differential developed across its vane 78 for creating output power, rather than also relying upon expansion of the pressurized input gas. Accordingly, a highly efficient actuator assembly is provided having long and reliable life and operation. Yet the entire assembly is provided as an extremely compact, lightweight unit by virtue of the housing arrangement and the pair of parallel chambers 54 and 56 for receiving both the vane motor and the output member 36 as well as the LVDT sensor.

From the foregoing it will further be apparent that the present invention provides an improved method for positioning output member 36 by delivering pressurized gas to the bi-directional, pneumatic vane motor 32 to effect rotation of shaft 40. The vanes 78 are permitted to shift radially only while not subject to side loading created by the pressurized gas. The rotary motion of shaft 40 is translated into linear shifting of member 36 by virtue of the transmission 38, and the actual position of the member is sensed and flow to the motor 32 is controlled in response to the sensed position in order to precisely control positioning of the linearly shifting output member 36.

Various modifications and alterations to the above described embodiment will be apparent to those skilled in the art. Accordingly, the foregoing detailed description of a preferred arrangement of the invention should be considered exemplary in nature and not as limiting to the scope and spirit of the invention as set forth in the appended claims.

Having described the invention with sufficient clarity that those skilled in the art may make and use it, I claim:

1. In combination:

a generally elongated housing having a pair of separate, internal, elongated chambers therewithin;

a linearly shiftable mechanical output member mounted for reciprocation within one of said chambers;

a rotary, bi-directional, pneumatic vane motor operably disposed in the other said chambers;

a power output shaft operably coupled to said motor and mounted for rotation within said housing, said output shaft extending substantially parallel to said linear member;

gearing means operably extending transversely across said housing between said output shaft and said output member for effecting linear shifting of said member in response to rotation of said output shaft, said output shaft being rotatable in opposite directions to effect corresponding opposite shifting of said output member;

elongated sensing means disposed in said one chamber for sensing the linear position of said output member;

a source of pressurized gas;

conduit means for communicating said source with said motor to effect rotation thereof; and directional flow control means operably disposed in said conduit means and operably associated with said sensing means for controlling motor operation in relation to said sensed position of the output member.

2. A combination as set forth in claim 1 wherein said control means are mounted upon said housing.

3. A combination as set forth in claim 1, further including pneumatically operated detent means mounted to said housing and cooperable with said transmission means for locking the latter to prevent displacement of said member, said conduit means communicating with said detent means for actuating the latter to release said detent means.

4. A combination as set forth in claim 1, wherein said transmission means includes Acme screw gearing operably associated with said output shaft and said member for translating said rotary motion of the shaft into linear motion of said element.

5. A combination as set forth in claim 1, wherein said source is located remotely from said housing, and further including pressure regulator means operably communicating with said conduit means and located remotely from said housing for regulating pressurized gas delivered through said conduit means to said housing to a constant, preselected pressure level.

6. A combination as set forth in claim 1, wherein said sensing means are electrically operated, and said flow control means are responsive to an electrical input signal, said system further including an electrical command control system responsive to a command input signal indicative of a desired position of said member for actuating said flow control means to shift said member to said desired position.

7. A combination as set forth in claim 6, wherein said sensing means includes a linear variable differential transformer.

8. An actuator system comprising:

a source of pressurized gas;

a rotary, bi-directional, pneumatic vane motor;

conduit means communicating said source with said motor to effect rotation of the latter;

a rotary power output shaft driven by said motor;

a linearly displaceable power output member;

transmission means operably coupling said output shaft with said member for effecting linear shifting of said member in response to rotation of said power output shaft;

electrical sensor means for sensing the linear position of said member;

electrically actuated pneumatic flow control means disposed in said conduit means and operably coupled with electrical sensing means for controlling operation of said motor to position said member;

said motor including a housing having an axially elongated internal chamber, a centrally located exhaust port communicating with said chamber, and a pair of gas receiving ports disposed on opposite sides of said central exhaust port communicating with said chamber;

a rotor rotatably mounted within said chamber, said rotor having axially elongated, radially extending slots, said rotor rotatable about a central longitudinal axis;

a vane reciprocally disposed within each of said radial slots of the rotor and extending from said rotor radially outward to cooperate with the wall of said chamber to define gas carrying interspaces between adjacent vanes and the chamber wall, said chamber being symmetrically configured about a plane extending through said central exhaust port, said chamber including circular sections extending between each of said receiving ports and said central exhaust port, said wall of the chamber in said circular sections being configured to prevent radial reciprocation of said vanes while rotating within said circular sections, said chamber further defining port sections respectively extending along the length of each of said receiving ports, said wall of the chamber in said port sections being configured to permit radial shifting of said vanes as the latter rotate through said port sections while assuring that interspaces on opposite sides of vanes positioned in said port sections communicate with the corresponding port, whereby said vanes are pressure balanced while reciprocating radially within said port sections, said flow control means including a pair of closed center, double acting poppet valves for controlling communication of each of said receiving ports with said conduit means and a low pressure exhaust, each of said poppet valves including a movable poppet cooperable in first and second positions to respectively engage and disengage a cooperating first seat on said first housing to interrupt and permit communication between the associated receiving port and said conduit means, and each of said poppets including a central through passage therewithin having one end communicating with said associated receiving port at all positions of said poppet, the opposite end of said passage defining a second seat, each of said poppet valves further including a ball engageable and disengageable with said seat respectively in said second and first positions to permit and interrupt communication between the associated receiving port and said low pressure exhaust through said central through passage.

9. A system as set forth in claim 8, wherein each of said poppet valves includes biasing means urging the associated poppet valves toward said first positions thereof.

10. A system as set forth in claim 9, wherein said flow control means includes a single, pivotal beam link engageable with said poppet valves for shifting the latter in unison in opposite directions.

11. A system as set forth in claim 10 wherein said flow control means further includes a proportional electrical solenoid operably engaging said beam link to effect pivoting thereof.

12. A system as set forth in claim 11, further including a spring engaging said beam link to urge the latter to pivot in a direction shifting one of said poppet valves to its first position and shifting the other poppet valve to its second position.

* * * * *